US011935682B2

(12) United States Patent
Jeon et al.

(10) Patent No.: US 11,935,682 B2
(45) Date of Patent: Mar. 19, 2024

(54) COIL COMPONENT AND MANUFACTURING METHOD FOR THE SAME

(71) Applicant: SAMSUNG ELECTRO-MECHANICS CO., LTD., Suwon-si (KR)

(72) Inventors: Hyung Jin Jeon, Suwon-si (KR); Seon Woo Oh, Suwon-si (KR); Soon Kwang Kwon, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 827 days.

(21) Appl. No.: 16/566,227

(22) Filed: Sep. 10, 2019

(65) Prior Publication Data

US 2020/0143976 A1 May 7, 2020

(30) Foreign Application Priority Data

Nov. 7, 2018 (KR) ........................ 10-2018-0136127

(51) Int. Cl.

*H01F 27/28* (2006.01)
*H01F 27/29* (2006.01)
*H01F 27/32* (2006.01)
*H01F 41/04* (2006.01)

(52) U.S. Cl.

CPC ....... *H01F 27/2804* (2013.01); *H01F 27/292* (2013.01); *H01F 27/32* (2013.01); *H01F 41/041* (2013.01); *H01F 2027/2809* (2013.01)

(58) Field of Classification Search

CPC ............. H01F 17/0013; H01F 27/2804; H01F 2027/2809; H01F 17/0006; H01F 5/003; H01F 27/29; H01F 27/292; H01F 27/32

USPC .................................................. 336/200, 232

See application file for complete search history.

(56) References Cited

U.S. PATENT DOCUMENTS

2010/0052838 A1 3/2010 Matsuta et al.
2012/0326828 A1 12/2012 Nakamura et al.
2013/0222101 A1* 8/2013 Ito ............................ H01F 3/08 336/83

(Continued)

FOREIGN PATENT DOCUMENTS

CN 101667484 A 3/2010
CN 103180919 A 6/2013

(Continued)

OTHER PUBLICATIONS

Chinese Office Action dated Apr. 6, 2021 issued in Chinese Patent Application No. 201911043300.7 (with English translation).

*Primary Examiner* — Tszfung J Chan

(74) *Attorney, Agent, or Firm* — Morgan, Lewis & Bockius LLP

(57) ABSTRACT

A coil component includes a body including magnetic metal powder and an insulating resin, an insulating substrate embedded in the body, a coil portion disposed on at least one side of the insulating substrate the body, and having a lead-out pattern exposed from one of end surfaces of the body opposing each other, an external insulating layer exposing the lead-out pattern while surrounding the body, and including a magnetic ceramic, and an external electrode disposed on the body, and connected to the lead-out pattern.

13 Claims, 7 Drawing Sheets

I-I'

(56) References Cited

U.S. PATENT DOCUMENTS

| | | | | |
|---|---|---|---|---|
| 2014/0145797 | A1* | 5/2014 | Bae | H01F 17/0013 333/185 |
| 2015/0187487 | A1* | 7/2015 | Park | H01F 17/0013 336/192 |
| 2016/0055955 | A1 | 2/2016 | Park et al. | |
| 2016/0240296 | A1* | 8/2016 | Kim | H01F 17/04 |
| 2016/0260535 | A1* | 9/2016 | Kubota | H01F 17/0013 |
| 2016/0268038 | A1 | 9/2016 | Choi | |
| 2017/0309388 | A1* | 10/2017 | Park | H01F 41/0233 |
| 2018/0061553 | A1 | 3/2018 | Jeon et al. | |
| 2018/0166198 | A1* | 6/2018 | Kim | H01F 27/022 |
| 2018/0218830 | A1 | 8/2018 | Nakanishi et al. | |
| 2018/0268987 | A1 | 9/2018 | Yoon et al. | |
| 2020/0043644 | A1* | 2/2020 | Sato | H01F 27/323 |
| 2020/0365315 | A1* | 11/2020 | Kim | H01F 27/292 |

FOREIGN PATENT DOCUMENTS

| | | | | | |
|---|---|---|---|---|---|
| CN | 105957692 | A | | 9/2016 | |
| CN | 108630381 | A | | 10/2018 | |
| JP | 2018-125414 | A | | 8/2018 | |
| KR | 10-1475129 | B1 | | 12/2014 | |
| KR | 10-2015-0028980 | A | | 3/2015 | |
| KR | 10-1580406 | B1 | | 12/2015 | |
| KR | 2016018935 | A | * | 2/2016 | |
| KR | 2016108935 | A | * | 9/2016 | H01F 17/0013 |
| KR | 10-2018-0025565 | A | | 3/2018 | |

* cited by examiner

COIL COMPONENT AND MANUFACTURING METHOD FOR THE SAME

CROSS-REFERENCE TO RELATED APPLICATION(S)

This application claims benefit of priority to Korean Patent Application No. 10-2018-0136127 filed on Nov. 7, 2018 in the Korean Intellectual Property Office, the disclosure of which is incorporated herein by reference in its entirety.

TECHNICAL FIELD

The present disclosure relates to a coil component and a method of manufacturing the coil component.

BACKGROUND

An inductor, a coil component, is a typical passive electronic component used in an electronic device, along with a resistor and a capacitor.

A coil is formed by plating, and then a magnetic powder-resin composite, in which magnetic powder and a resin are mixed, is cured to manufacture a body, and an external electrode is formed outside the body, so the thin film type coil component is manufactured.

In general, an insulating resin is applied to a surface of a body to increase a breakdown voltage (BDV) of a thin film type coil component. However, an entire thickness of the thin film type coil component may be increased.

SUMMARY

An aspect of the present disclosure is to provide a coil component capable of increasing a breakdown voltage (BDV) of a product while an entire thickness of a product is reduced, and a method of manufacturing the same.

Another aspect of the present disclosure is to provide a coil component capable of preventing a deterioration of device characteristics by increasing an effective volume of a magnetic body, and a method of manufacturing the same.

According to an aspect of the present disclosure, a coil component includes a body including magnetic metal powder and an insulating resin, an insulating substrate embedded in the body, a coil portion disposed on at least one side of the insulating substrate the body, and having a lead-out pattern exposed from one of end surfaces of the body opposing each other, an external insulating layer exposing the lead-out pattern while surrounding the body, and including a magnetic ceramic, and an external electrode disposed on the body, and connected to the lead-out pattern.

Other features and aspects will be apparent from the following detailed description, the drawings, and the claims.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
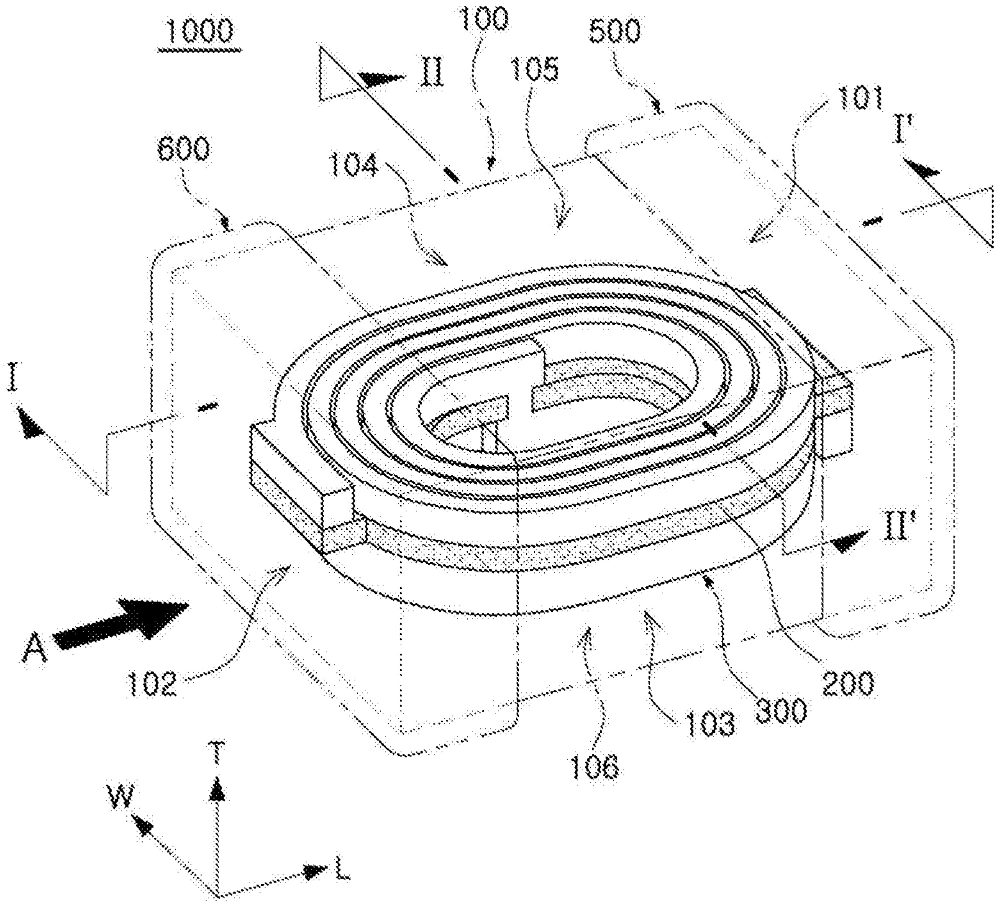
FIG. 1 is a schematic view of a coil component according to an embodiment.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

In the drawings, the L direction may be defined as a first direction or a longitudinal direction, the W direction may be defined as a second direction or a width direction, and the T direction may be defined as a third direction or a thickness direction.

Hereinafter, a coil component and a method of manufacturing the coil component according to an embodiment will be described in detail with reference to the accompanying drawings. Referring to the accompanying drawings, the same or corresponding components are denoted by the same reference numerals, and a duplicate description thereof will be omitted.

Various types of electronic components are used in electronic devices. Here, various types of coil components may be suitably used for the purpose of noise removal or the like among these electronic components.

In other words, a coil component in an electronic device may be used as a power inductor, a high frequency (HF) inductor, a general bead, a GHz bead, a common mode filter, or the like.

Embodiment of Coil Component

Figure 2:
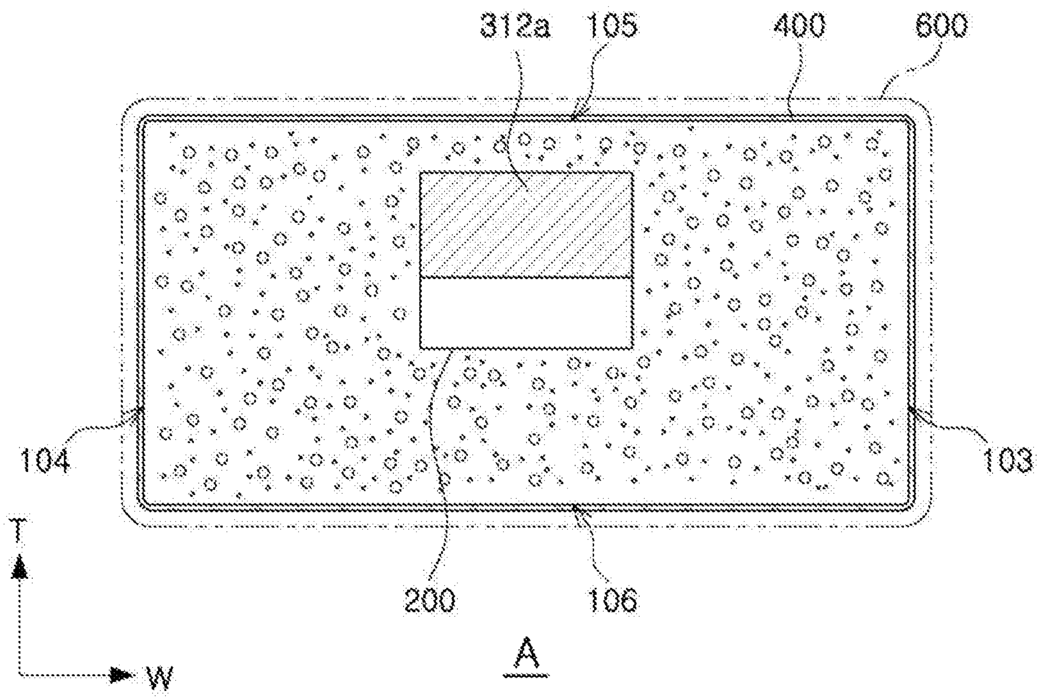
FIG. 2 is a schematic view illustrating a coil component viewed in the direction A in FIG. 1.
Figure 3:
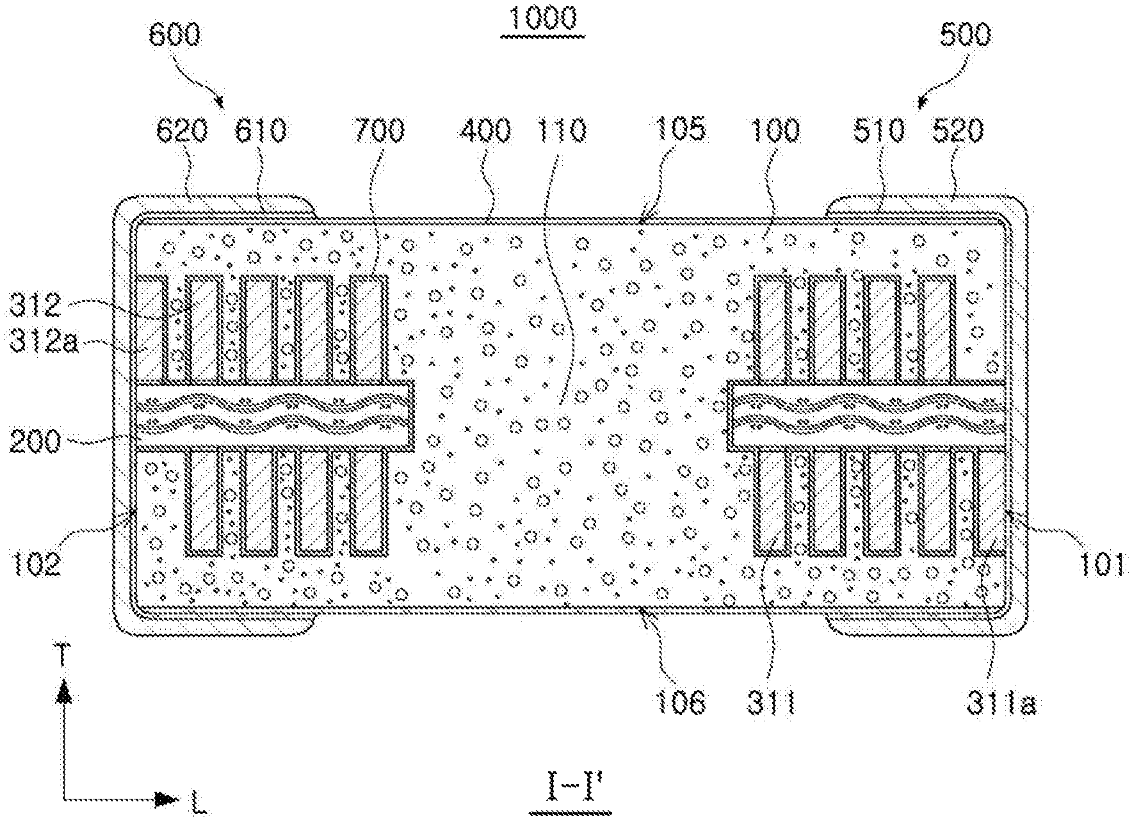
FIG. 3 is a schematic cross-sectional view taken along line I-I' of FIG. 1.
Figure 4:
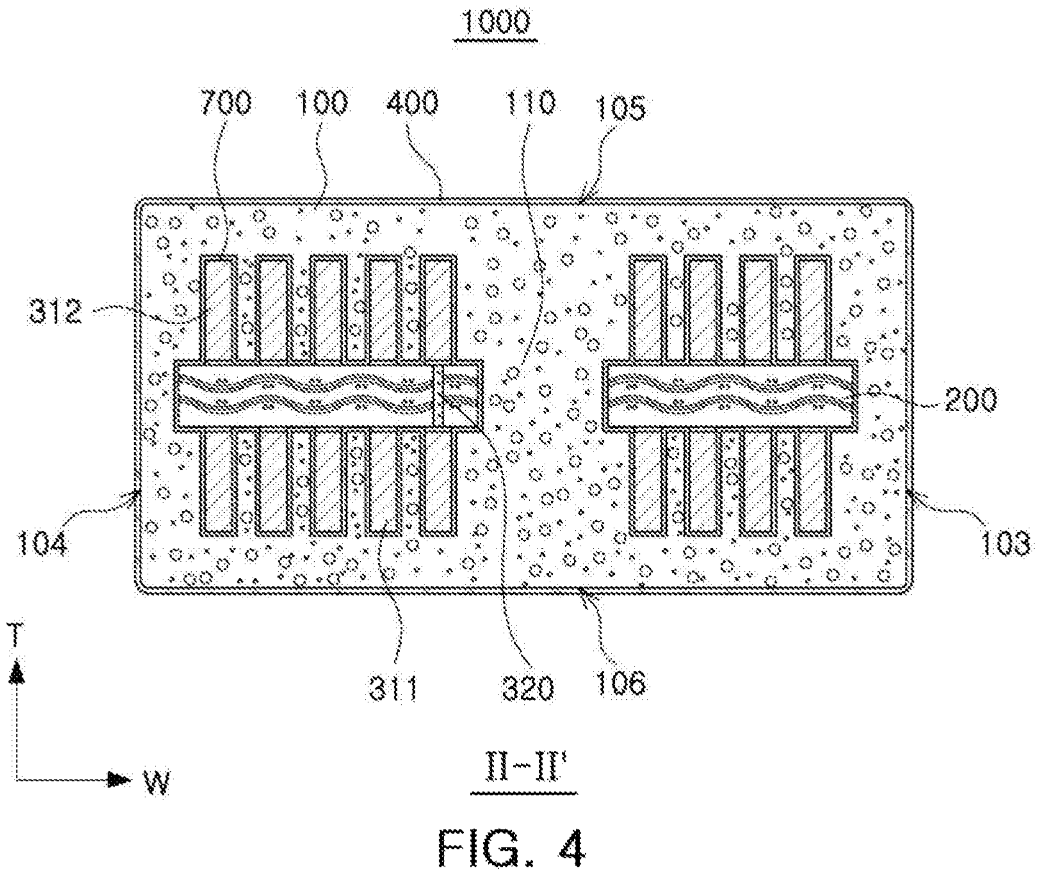
FIG. 4 is a schematic cross-sectional view taken along line II-II' of FIG. 1.

FIG. 1 is a schematic view of a coil component according to an embodiment. FIG. 2 is a schematic view illustrating a coil component viewed in the direction A in FIG. 1. FIG. 3 is a schematic cross-sectional view taken along line I-I' of FIG. 1. FIG. 4 is a schematic cross-sectional view taken along line II-II' of FIG. 1.

Referring to FIGS. 1 to 4, a coil component 1000 according to an embodiment includes a body 100, an insulating substrate 200, a coil portion 300, an external insulating layer 400, and external electrodes 500 and 600.

The body 100 forms an appearance of the coil component 1000 according to an embodiment, and the insulating substrate 200 and the coil portion 300 are embedded therein.

The body 100 may be hexahedral as a whole.

The body 100 includes a first surface 101 and a second surface 102 opposing each other in a longitudinal direction L, a third surface 103 and a fourth surface 104 opposing each other in a width direction W, and a fifth surface 105 and a sixth surface 106 opposing each other in a thickness direction T. Each of the first to fourth surfaces 101, 102, 103, and 104 of the body 100 may connect the fifth surface 105 to the sixth surface 106 of the body 100. Hereinafter, both end surfaces of the body 100 refer to the first surface 101 and the second surface 102 of the body 100, while both side surfaces of the body 100 refer to the third surface 103 and the fourth surface 104 of the body 100. Moreover, one side and the other side of the body 100 refer to the sixth surface 106 and the fifth surface 105 of the body 100, respectively.

The body 100 may be formed to allow the coil component 1000 having external electrodes 500 and 600 to be described later, according to an embodiment, to have a length of 2.0 mm, a width of 1.2 mm, and a thickness of 0.65 mm, by way of example, but is not limited thereto.

The body 100 may include magnetic metal powder and an insulating resin. In detail, the body 100 may be formed by stacking one or more magnetic composite sheets including insulating resin and magnetic metal powder dispersed in the insulating resin.

The magnetic metal powder may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the magnetic metal powder may be at least one or more among pure iron powder, Fe—Si-based alloy powder, Fe—Si—Al-based alloy powder, Fe—Ni-based alloy powder, Fe—Ni—Mo-based alloy powder, Fe—Ni—Mo—Cu-based alloy powder, Fe—Co-based alloy powder, Fe—Ni—Co-based alloy powder, Fe—Cr-based alloy powder, Fe—Cr—Si-based alloy powder, Fe—Si—Cu—Nb-based alloy powder, Fe—Ni—Cr-based alloy powder, and Fe—Cr—Al-based alloy powder.

The magnetic metal powder may be amorphous or crystalline. For example, the magnetic metal powder may be Fe—Si—B—Cr-based amorphous alloy powder, but is not limited thereto.

The magnetic metal powder may have an average diameter of about 0.1 μm to 30 μm, but is not limited thereto.

The body 100 may include two or more types of magnetic metal powder dispersed in the insulating resin. Here, the different types of magnetic metal powder mean that the magnetic metal powder, dispersed in the insulating resin, is distinguished from each other by any one of an average diameter, a composition, crystallinity, and a shape.

The insulating resin may include one among epoxy, polyimide, a liquid crystal polymer, or a mixture thereof, but is not limited thereto.

The body 100 includes a core 110 passing through a coil portion 300 to be described later. The core 110 may be formed by filling a through hole of the coil portion 300 with the magnetic composite sheet, but is not limited thereto.

The insulating substrate 200 may be embedded in the body 100. The insulating substrate 200 may be provided as a component supporting a coil portion 300 to be described later.

The insulating substrate 200 may be formed as an insulating material including a thermosetting resin such as an epoxy resin, a thermoplastic resin such as a polyimide, or a photosensitive insulating resin, or may be formed as an insulating resin in which a stiffener such as a glass fiber or an inorganic filler is impregnated. As an example, the insulating substrate 200 may be formed of an insulating material such as prepreg, an Ajinomoto build-up film (ABF), an FR-4, a bismaleimide triazine (BT) resin, a photo imagable dielectric (PID), a copper clad laminate (CCL), but is not limited thereto.

The inorganic filler may be one or more selected from the group consisting of silica ($SiO_2$), alumina ($Al_2O_3$), silicon carbide (SiC), barium sulphate ($BaSO_4$), talc, mud, mica powder, aluminum hydroxide ($AlOH_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$).

When the insulating substrate 200 is formed of an insulating material including a stiffener, the insulating substrate

200 may provide more excellent stiffness. When the insulating substrate 200 is formed of an insulating material not including a glass fiber, the insulating substrate 200 is advantageous for reducing a thickness of the entirety of the coil portion 300, that is, low-profile. When the insulating substrate 200 is formed of an insulating material including a photosensitive insulating resin, the number of processes for formation of the coil portion 300 is reduced, so it is advantageous to reduce production costs, and fine via can be formed.

The coil portion 300 is embedded in the body 100, thereby having characteristics of a coil component. For example, when the coil component 1000 according to an embodiment is used as a power inductor, the coil portion 300 may function to stabilize the power of an electronic device by storing an electric field as a magnetic field and maintaining an output voltage.

The coil portion 300 is disposed on at least one side of the insulating substrate 200, and forms at least one turn. The coil portion 300 may have lead-out patterns 311*a* and 312*a*, exposed to the first surface 101 and the second surface 102, both end surfaces of the body 100, opposing each other.

In an embodiment, the coil portion 300 may include first and second coil patterns 311 and 312, formed in both sides of the insulating substrate 200, opposing each other, in a thickness direction T of the body 100, first and second lead-out patterns 311*a* and 312*a*, formed in both sides of the insulating substrate 200 to be in contact with and connected to the first and second coil patterns 311 and 312, and a via 320 passing through the insulating substrate 200 connect the first and second coil patterns 311 and 312 to each other.

Each of the first and second coil patterns 311 and 312 may have a shape of a planar coil forming at least one turn around the core 110 provided as an axis. That is, based on FIG. 3, the first coil pattern 311 may form at least one turn around the core 110 in a lower surface of the insulating substrate 200, while the second coil pattern 312 may form at least one turn around the core 110 in an upper surface of the insulating substrate 200.

The first and second lead-out patterns 311*a* and 312*a* may be in contact with and connected to the first and second coil patterns 311 and 312, respectively. That is, based on FIG. 3, the first lead-out pattern 311*a*, disposed on a lower surface of the insulating substrate 200, is in contact with and connected to the first coil pattern 311, disposed on the lower surface of the insulating substrate 200. Based on FIG. 3, the second lead-out pattern 312*a*, disposed on an upper surface of the insulating substrate 200, is in contact with and connected to the second coil pattern 312, disposed on the upper surface of the insulating substrate 200.

Each of the first and second lead-out patterns 311*a* and 312*a* may be formed integrally with each of the first and second coil patterns 311 and 312. As an example, the first lead-out pattern 311*a* is formed together with the first coil pattern 311 in the same plating process, so boundaries therebetween are not formed and the first lead-out pattern and the first coil pattern are integrally formed. However, the scope of the present disclosure is not limited to the above.

The first and second lead-out patterns 311*a* and 312*a* may be in contact with and connected to the first and second external electrodes 500 and 600, respectively. That is, the first lead-out pattern 311*a* is exposed to the first surface 101 of the body 100 to be in contact with and connected to the first external electrode 500, while the second lead-out pattern 312*a* is exposed to the second surface 102 of the body 100 to be in contact with and connected to the second external electrode 600.

At least one among the coil patterns 311 and 312, the via 320, and the lead-out patterns 311*a* and 312*a* may include one or more conductive layers.

As an example, when the second coil pattern 312, the second lead-out pattern 312*a*, and the via 320 are formed on the other side of the insulating substrate 200 by plating, each of the second coil pattern 312, the second lead-out pattern 312*a*, and the via 320 may include a seed layer such as an electroless plating layer, or the like, and an electroplating layer. Here, the electroplating layer may have a monolayer structure, and may have a multilayer structure. The electroplating layer with a multilayer structure may have a conformal film structure in which one electroplating layer is formed along a surface of the other electroplating layer, and may have a form in which one electroplating layer is only stacked on one side of the other electroplating layer. In this case, a seed layer of the second coil pattern 312, a seed layer of the second lead-out pattern 312*a*, and a seed layer of the via 320 are integrally formed, so boundaries therebetween may not be formed, but an embodiment is not limited thereto. An electroplating layer of the second coil pattern 312, an electroplating layer of the second lead-out pattern 312*a*, and an electroplating layer of the via 320 are integrally formed, so boundaries therebetween may not be formed, but an embodiment is not limited thereto.

As another example, with respect to directions of FIGS. 1 to 3, a first coil pattern 311 and a first lead-out pattern 311*a*, disposed on a lower surface of the insulating substrate 200, and a second coil pattern 312 and a second lead-out pattern 312*a*, disposed on an upper surface of the insulating substrate 200, are provided separately from each other, and then batch-stacked on the insulating substrate 200 to form the coil portion 300. In this case, the via 320 may include a high melting point metal layer and a low melting point metal layer having a melting point, lower than a melting point of the high melting point metal layer. Here, the low melting point metal layer may be formed of a solder including lead (Pb) and/or tin (Sn). At least a portion of the low melting point metal layer is melted due to the pressure and temperature during the batch stack, so an inter metallic compound (IMC) layer may be formed at a boundary between the low melting point metal layer and the second coil pattern 312 and/or a boundary between the low melting point metal layer and the first coil pattern 311, by way of example.

The coil patterns 311 and 312 and the lead-out patterns 311*a* and 312*a* may protrude from the lower surface and the upper surface of the insulating substrate 200, respectively, as illustrated in FIGS. 3 and 4. As another example, the first coil pattern 311 and the first lead-out pattern 311*a* protrude from a lower surface of the insulating substrate 200, and the second coil pattern 312 and the second lead-out pattern 312*a* are embedded in the upper surface of the insulating substrate 200, so an upper surface thereof may be exposed to the upper surface of the insulating substrate 200. In this case, a concave portion is formed on an upper surface of the second coil pattern 312 and/or an upper surface of the second lead-out pattern 312*a*, so the upper surface of the insulating substrate 200, the upper surface of the second coil pattern 312, and/or the upper surface of the second lead-out pattern 312*a* may not be located on the same plane.

Each of the coil patterns 311 and 312, the lead-out patterns 311*a* and 312*a*, and the via 320 may include a conductive material such as copper (Cu), aluminum (Al), silver (Ag), tin (Sn), gold (Au), nickel (Ni), lead (Pb), titanium (Ti), or alloys thereof, but are not limited thereto.

If line widths of the coil patterns 311 and 312 are excessively great, a volume of a magnetic body in a volume of the same body 100 is reduced, so the inductance may be adversely affected. By way of example only and without limitations, an aspect ratio (AR) of the coil patterns 311 and 312 may be 3:1 to 9:1.

The external insulating layer 400 exposes the lead-out patterns 311*a* and 312*a* while surrounding the body 100, and includes magnetic ceramic. In this specification, the magnetic ceramic may mean ferrite including iron oxide, but is not limited thereto.

As an example of the iron oxide, the ferrite may be, for example, at least one or more among spinel type ferrite such as Mg—Zn-based, Mn—Zn-based, Mn—Mg-based, Cu—Zn-based, Mg—Mn—Sr-based, Ni—Zn-based ferrite, or the like, hexagonal ferrite such as Ba—Zn-based, Ba—Mg-based, Ba—Ni-based, Ba—Co-based, Ba—Ni—Co-based ferrite, or the like, garnet type ferrite such as Y-based ferrite, or the like, and Li-based ferrite.

The external insulating layer 400 may include an insulating resin and magnetic ceramic dispersed in the insulating resin. However, the external insulating layer 400 may be formed of magnetic ceramic to increase a volume of a magnetic body with respect to a volume of the same component. In the case of the latter, compared with the former, the entire volume of a magnetic body with respect to the total volume of the same component can be increased. Thus, the inductance and a Q factor (a quality factor) of the coil component 1000 according to an embodiment can be improved. In the case of the former, compared with the latter, the external insulating layer 400 can be relatively easily formed. In the case of the former, the external insulating layer 400 may be formed by stacking a material for formation of an external insulating layer including an insulating resin and magnetic ceramic dispersed in the insulating resin on the body 100. In the case of the latter, the external insulating layer may be formed using a thin film process such as a plating process, a vapor deposition process, or the like. When the external insulating layer 400 is formed using the vapor deposition process, at least a portion of the magnetic ceramic forming the external insulating layer 400 may penetrate the body 100 in certain cases.

The external insulating layer 400 may function as a plating resist in forming external electrodes 500 and 600, to be described later, by plating. In detail, the external insulating layer 400 may have a relatively higher electrical insulation than that of the external electrodes 500 and 600.

The external electrodes 500 and 600 are disposed on the body 100, and are in contact with and connected to the lead-out patterns 311*a* and 312*a*.

The external electrodes 500 and 600 may be formed by applying and curing a paste containing conductive powder to the body 100, or may be formed on a surface of the body 100 by a plating process. In an embodiment, the external electrodes 500 and 600 are formed using a plating process. When the external electrodes 500 and 600 are formed using a plating process, the external electrodes 500 and 600 can be formed relatively thin, so a thickness of the entirety of the coil component 1000 according to an embodiment can be reduced.

Each of the external electrodes 500 and 600, applied to an embodiment, may include seed layers 510 and 610, and plated layers 520 and 620, formed on the seed layers 510 and 610. The seed layers 510 and 610 function as a feed layer when the plated layers 520 and 620 are formed by electrolytic plating. The seed layers may be formed on a surface of the body 100 having the external insulating layer 400 by a thin film process such as an electroless plating, a vapor deposition, or the like. The plated layers 520 and 620 may be formed by electrolytic plating using the seed layers 510 and 610. However, the scope of the present disclosure is not limited thereto, and the external electrodes 500 and 600 may be formed using other methods such as coating and curing a conductive resin.

The external electrodes 500 and 600 may be formed using a metal, and may be formed of one among nickel (Ni), copper (Cu), tin (Sn), titanium (Ti), chromium (Cr), or silver (Ag), or alloys thereof, by way of example. As an example, the seed layers 510 and 610 may be formed by a sputtering process, and may be provided as a single layer or a plurality of layers including at least one among titanium (Ti), chromium (Cr), and copper (Cu), while the plated layers 520 and 620 may include copper (Cu), but an embodiment is not limited thereto. As another example, the seed layers 510 and 610 are formed using an electroless copper plating process, and thus may include copper (Cu). In this case, the plated layers 520 and 620 are formed using electrolytic copper plating. Thus, even when the seed layers 510 and 610 and the plated layers 520 and 620 are formed of the same material, the seed layers and the plated layers may be distinguished from each other due to the difference in a size of a copper grain, density of a copper grain, or the like.

The plated layers 520 and 620 may be composed of a plurality of layers. As an example, each of the plated layers 520 and 620 may include a first plated layer including copper (Cu), a second plated layer including nickel (Ni), and a third plated layer including tin (Sn), but an embodiment is not limited thereto.

The insulating film 700 may be formed along surfaces of the coil patterns 311 and 312, the lead-out patterns 311*a* and 312*a*, and the insulating substrate 200. The insulating film 700 may protect the coil patterns 311 and 312 and the lead-out patterns 311*a* and 312*a*, and may insulate the coil patterns 311 and 312 and the lead-out patterns 311*a* and 312*a* from the body 100, and may include a known insulating material such as parylene. Any insulating material may be used for the insulating material included in the insulating film 700, and there is no particular limitation.

The insulating film 700 may be formed using a thin film process such as a vapor deposition process, or the like, but an embodiment is not limited thereto. As another example, the insulating film 700 may be formed by stacking an insulating material such as an insulating film on both sides of the insulating substrate 200, or may be formed by applying a liquid insulating resin to both sides of the insulating substrate 200.

Therethrough, in the coil component 1000 according to an embodiment, an external insulating layer 400 is formed on the entirety of surfaces 103, 104, 105, and 106 of the body 100 except the first and second surfaces 101 and 102 of the body 100. In this case, without forming a separate plating resist, the external electrodes 500 and 600 may be formed on the first and second surfaces 101 and 102 of the body 100 by plating.

Moreover, in the coil component 1000 according to an embodiment, the external insulating layer 400 may be formed of magnetic ceramic. As compared to the case in which an insulating film is stacked on a surface of the body 100 to form an insulating layer, the external insulating layer 400 may be formed thin. Accordingly, the coil component 1000 may have a low-profile.

Moreover, in the coil component 1000 according to an embodiment, the external insulating layer 400 includes magnetic ceramic. As compared to the case in which a non-magnetic insulating film is stacked on a surface of the body 100 to form an insulating layer, the total volume of a magnetic body can be increased within the volume of the same component. Thus, the inductance and a quality factor (a Q factor) of the coil component 1000 according to an embodiment can be improved.

Another Embodiment of Coil Component

Figure 5:
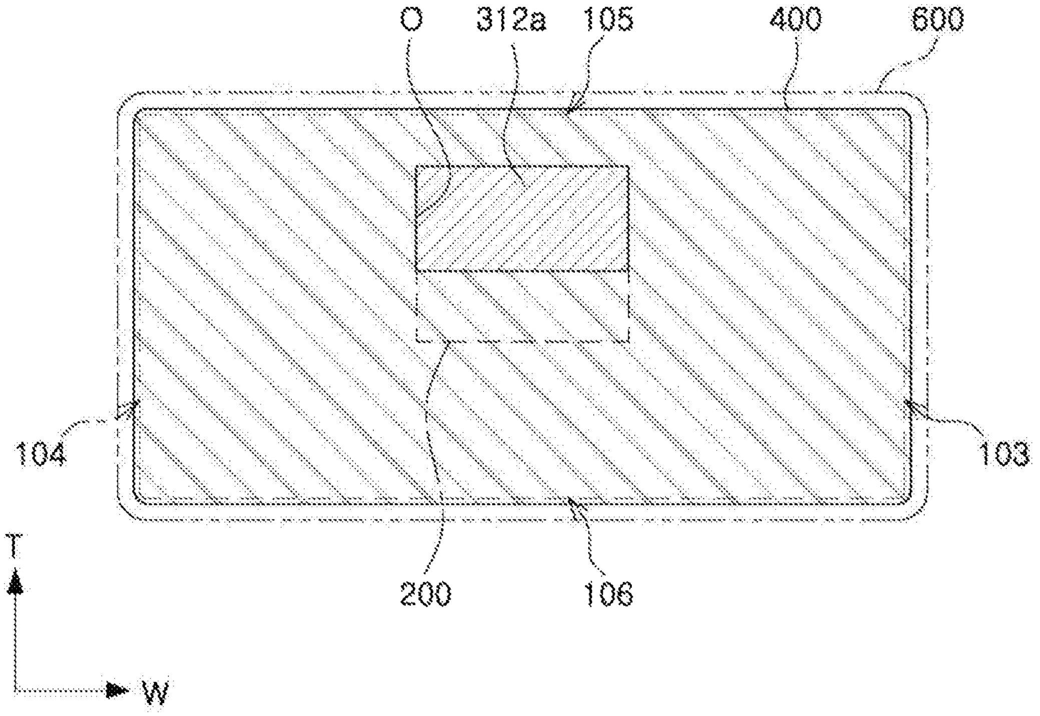
FIG. 5 is a schematic view of a coil component according to another embodiment, corresponding to FIG. 2.
Figure 6:
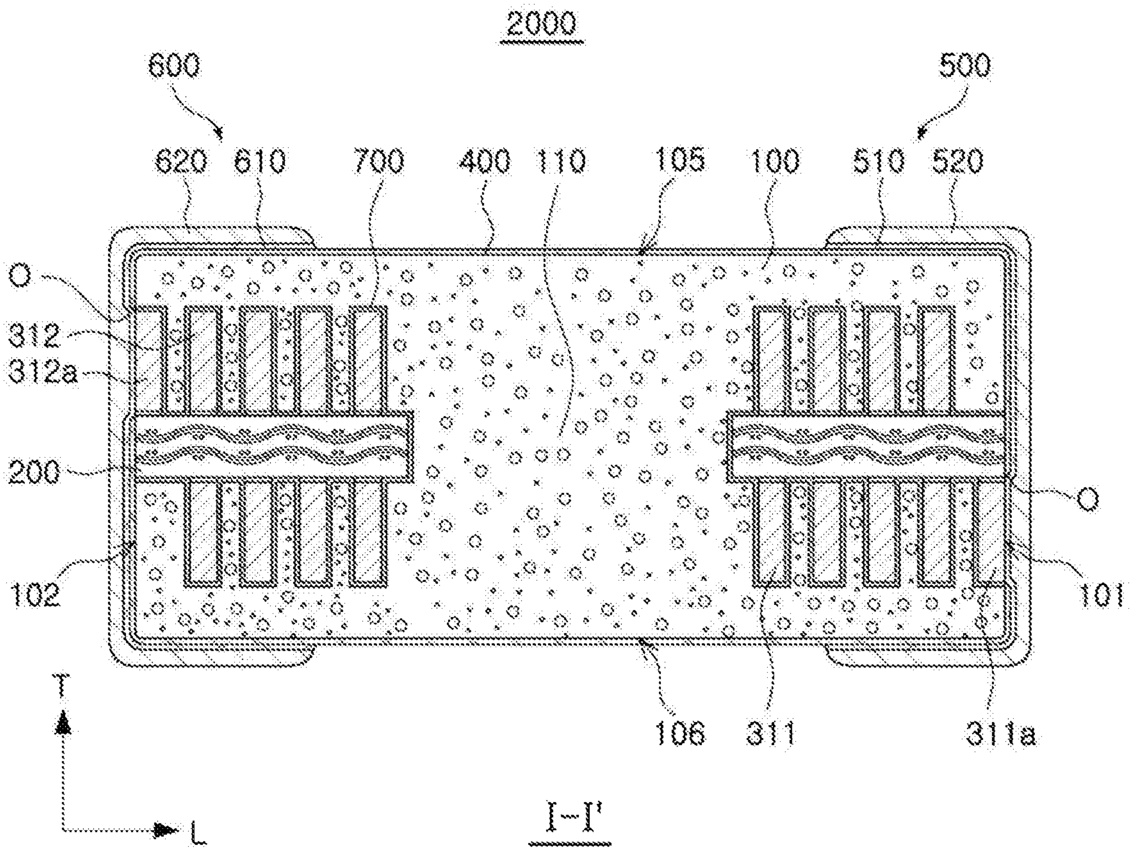
FIG. 6 is a schematic cross-sectional view of a coil component according to another embodiment, taken along line of I-I' of FIG. 1.

FIG. 5 is a schematic view of a coil component according to another embodiment, corresponding to FIG. 2. FIG. 6 is a schematic cross-sectional view of a coil component according to another embodiment, taken along line of I-I' of FIG. 1.

Referring to FIGS. 1 to 6, a coil component 2000 according to an embodiment may have an external insulating layer 400 different as compared with the coil component 1000 according to an embodiment. Thus, in describing an embodiment, the external insulating layer 400, different from that of an embodiment, will be only described. The description of an embodiment may be applied to other configurations of an embodiment as it is.

Referring to FIGS. 5 and 6, an external insulating layer 400 is formed on the first to sixth surfaces 101, 102, 103, 104, 105, and 106 of the body 100, and an opening O is formed to expose lead-out patterns 311*a* and 312*a* exposed to the first and second surfaces 101 and 102 of the body 100.

The opening O may be formed by selectively removing only a region corresponding to the lead-out patterns 311*a* and 312*a*, after the external insulating layer 400 is formed to cover the first to sixth surfaces 101, 102, 103, 104, 105, and 106 of the body 100. Alternatively, the opening O may be selectively formed by forming a mask in only a region of a surface of the body 100, corresponding to the lead-out patterns 311*a* and 312*a*, forming the external insulating layer 400 in the entirety of a surface of the body 100, and then removing the mask.

As long as the opening O exposes at least a portion of the lead-out patterns 311*a* and 312*a*, the scope of the present disclosure is not limited to a size, a shape, and the like, of the opening. That is, as illustrated in FIGS. 5 and 6, the opening O may expose the entirety of an exposed surface of the lead-out patterns 311*a* and 312*a*. In a manner different from that illustrated in FIGS. 5 and 6, a portion of an exposed surface of the lead-out patterns 311*a* and 312*a* may be only exposed. The opening O may be provided as a plurality of openings. For example, the opening O, exposing the first lead-out pattern 311*a*, may be provided as a plurality of openings.

In an embodiment, the external insulating layer 400 is formed on the first and second surfaces 101 and 102 of the body 100, so a volume of a magnetic body can be further improved in an entire volume of a component.

Method for Manufacturing Coil Component

FIGS. 7 to 11 are views sequentially illustrating a method of manufacturing a coil component according to an embodiment.

Figure 7:
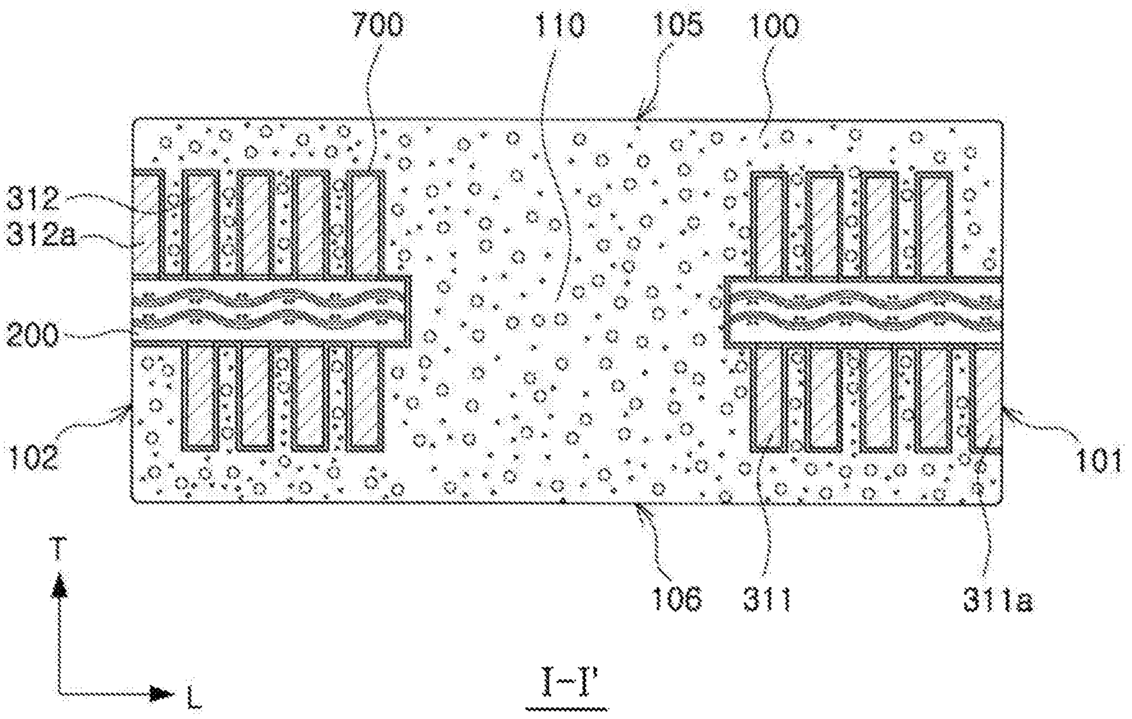
FIGS. 7 to 11 are views sequentially illustrating a method of manufacturing a coil component according to an embodiment.

First, referring to FIG. 7, the coil portion 300 having the lead-out patterns 311*a* and 312*a* is formed in an insulating substrate 200, and magnetic composite sheets are stacked on both sides of the insulating substrate 200 to form a body 100.

The coil portion 300 may be formed using at least one process among a subtractive process, an additive process (AP), a semi-additive process (SAP), and a modified semi-additive process (MSAP) in at least one side of the insulating substrate 200. By way of example only and without limitations, the second coil pattern 312, the second lead-out pattern 312*a*, and the via 320 may be formed using the SAP process on an upper surface of the insulating substrate 200 based on FIG. 7. Accordingly, each of the second coil pattern 312, the second lead-out pattern 312*a*, and the via 320 may have a seed layer formed integrally or separately from each other.

The coil portion 300 is formed on the insulating substrate 200, and then a through-hole, passing through the insulating substrate 200 and the coil portion 300, are formed for formation of a core, and an insulating film 700 is formed. The insulating film 700 is formed using a thin film process such as vapor deposition, or the like, and formed along surfaces of the insulating substrate 200, the coil portion 300, and the through-hole and formed to have a thin film which is conformal, but an embodiment is not limited thereto.

The insulating film 700 is formed, and then magnetic composite sheets are stacked on both sides of the insulating substrate 200. The magnetic composite sheet includes an insulating resin and magnetic metal powder dispersed in the insulating resin. One or more magnetic composite sheets may be stacked.

Meanwhile, the process described above may be performed, not in a unit of a single unit component, but in a panel unit or a strip unit in which a plurality of unit components are arranged in rows and columns, and dicing may be performed in a unit of each unit component after the insulating film 700 is formed. Thus, the lead-out patterns 311*a* and 312*a* may be exposed to a surface of the body 100.

Figure 8:
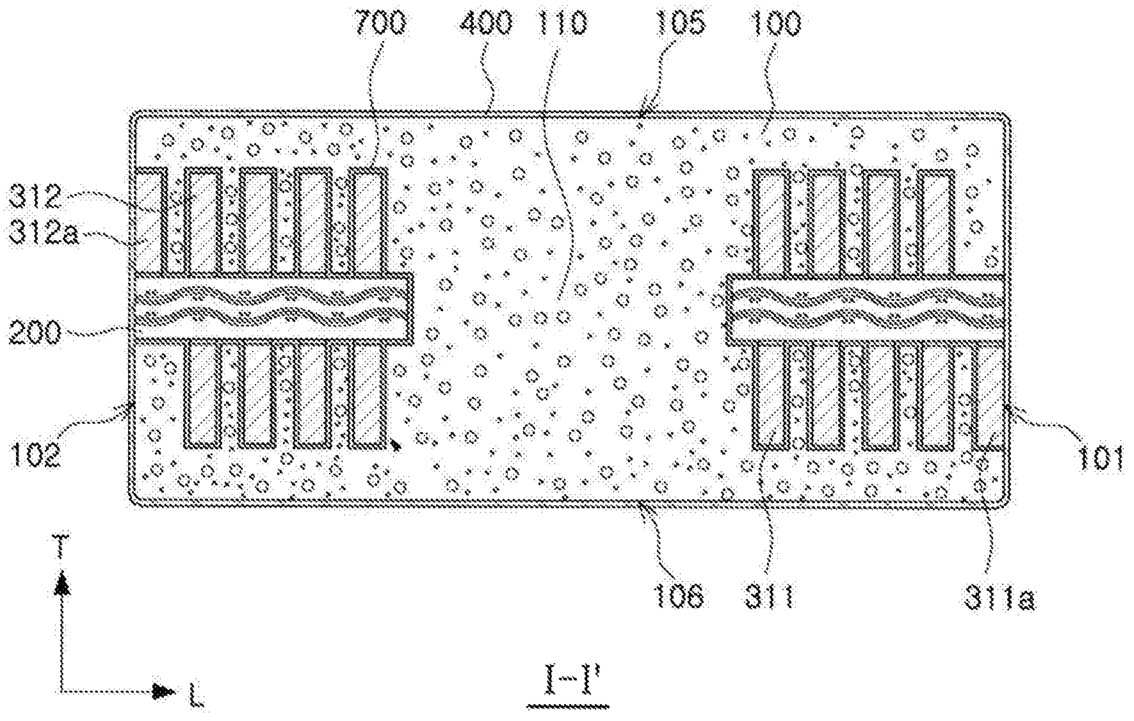

Then, referring to FIG. 8, an external insulating layer 400, including a magnetic ceramic, is formed in the entirety of a surface of the body 100.

The external insulating layer 400 may be formed by stacking magnetic sheets, including a magnetic ceramic and insulating resin, on the body 100. Alternatively, the external insulating layer 400 may be formed using a thin film process such as plating, vapor deposition, or the like. In the case of the latter, the external insulating layer 400 may be formed of magnetic ceramic. When the external insulating layer 400, formed of magnetic ceramic, is formed on a surface of the body 100, a plating voltage in the corresponding process is higher than a voltage in a plating process for formation of an external electrode to be described later due to relatively low electrical conductivity of magnetic ceramic.

Figure 9:
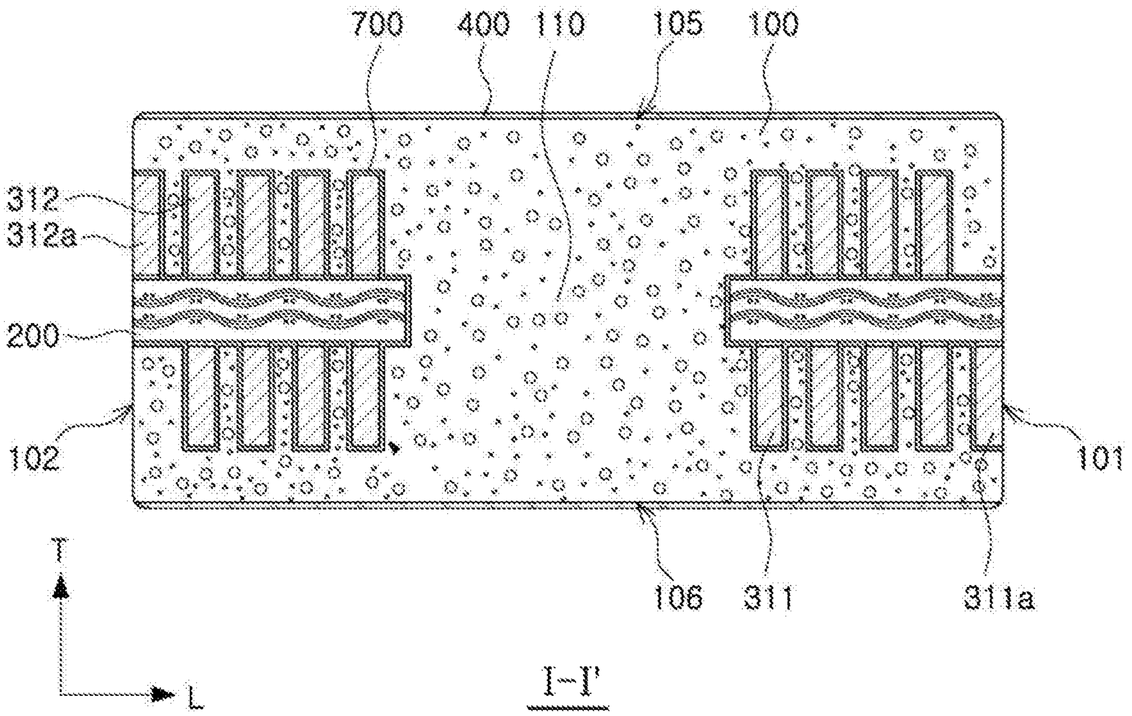

Then, referring to FIG. 9, a portion of the external insulating layer 400 is removed from a surface of the body 100 to expose the lead-out patterns 311*a* and 312*a*.

In an embodiment, in order to easily remove the external insulating layer 400, the entirety of the first and second surfaces 101 and 102 of the body 100 is exposed. A region of the external insulating layer 400, disposed on the first and second surfaces 101 and 102 of the body 100, may be removed through mechanical and/or chemical polishing.

Figure 10:
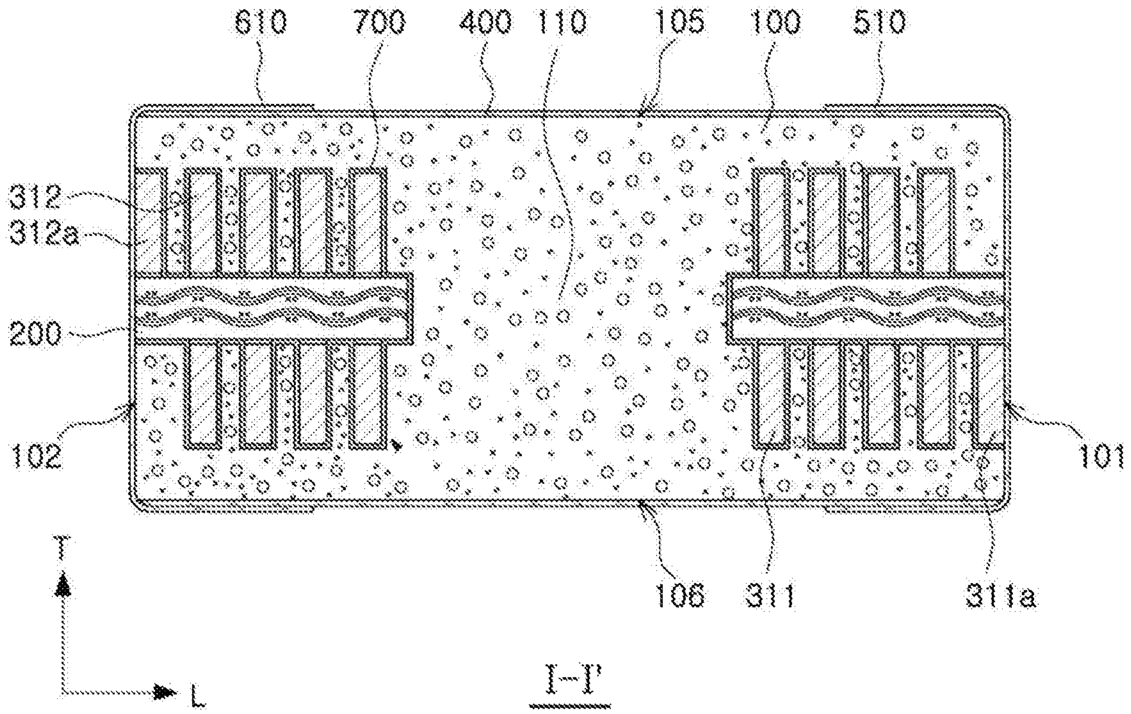
Figure 11:
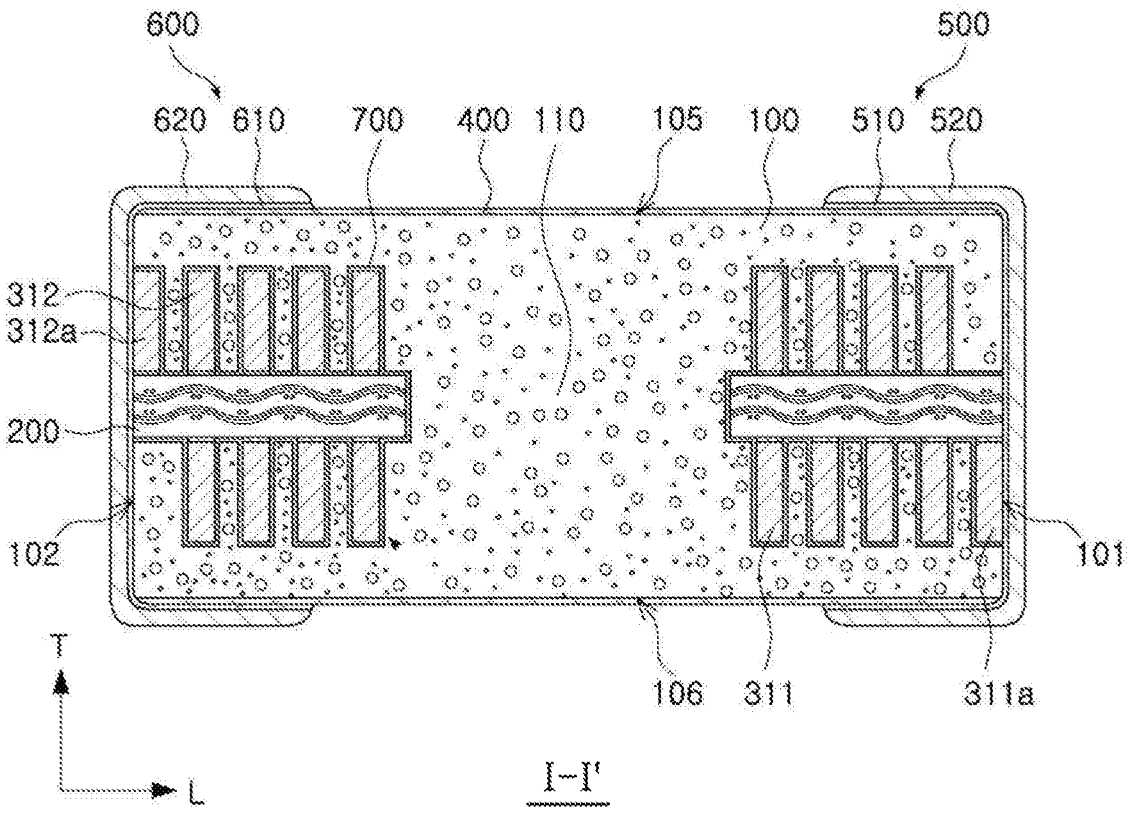

Then, referring to FIGS. 10 and 11, external electrodes 500 and 600 are formed in the body 100.

First, seed layers 510 and 610 are formed on the first and second surfaces 101 and 102 of the body 100, respectively. The seed layers 510 and 610 may be formed using a thin film process such as electroless plating, vapor deposition, or the like.

Then, while the seed layers 510 and 610 are provided as a feed layer, electrolytic plating is performed to form plated layers 520 and 620.

Meanwhile, in describing an embodiment, a form is described, in which the external electrodes 500 and 600 are formed on the first and second surfaces 101 and 102 of the body 100 to be extended to another surface of the body 100, by way of example, but forms of the external electrodes 500 and 600 may be variously modified.

Moreover, in describing an embodiment, it is described that the external electrodes 500 and 600 are formed by plating, by way of example, but the external electrodes 500 and 600 may be formed by applying and curing a conductive resin on a surface of the body 100. Alternatively, the external electrodes 500 and 600 may be formed by performing a plating process after applying and curing a conductive resin.

As set forth above, according to an embodiment in the present disclosure, a breakdown voltage (BDV) may be increased while an overall thickness of a coil component is reduced.

The effective volume of a magnetic body is increased in the entire volume of the coil component, so deterioration of the characteristics may be prevented.

While exemplary embodiments have been shown and described above, it will be apparent to those skilled in the art that modifications and variations could be made without departing from the scope of the present invention as defined by the appended claims.

What is claimed is:

1. A coil component, comprising:
- a body including a magnetic metal material and an insulating resin;
- an insulating substrate embedded in the body;
- a coil portion disposed on at least one surface of the insulating substrate, and having a coil pattern and a lead-out pattern extending from the coil pattern to one of end surfaces of the body opposing each other;
- an external insulating layer exposing the lead-out pattern while surrounding the body, and including a magnetic ceramic; and
- an external electrode disposed on the body, and connected to the lead-out pattern,
- wherein the external insulating layer is made of the magnetic ceramic and does not include a resin,
- the magnetic metal material includes an Fe-based alloy, and
- a portion of the external insulating layer is disposed between the external electrode and the Fe-based alloy.

2. The coil component of claim 1, wherein the magnetic ceramic includes an iron (Fe) component.

3. The coil component of claim 1, wherein the external insulating layer covers an entirety of surfaces of the body, except the end surfaces of the body.

4. The coil component of claim 1, wherein the coil portion includes:
- a first coil pattern disposed on one surface of the insulating substrate;
- a first lead-out pattern disposed on the one surface of the insulating substrate to be in contact with and connected to the first coil pattern, and having one side extending from the first coil pattern to the one end surface of the body;
- a second coil pattern disposed on another surface of the insulating substrate, opposing the one surface of the insulating substrate;
- a second lead-out pattern disposed on the another surface of the insulating substrate to be in contact with and connected to the second coil pattern, and having one side extending from the second coil pattern to another of the end surfaces of the body; and
- a via passing through the insulating substrate to connect the first and second coil patterns to each other.

5. The coil component of claim 1, wherein the external insulating layer and the body are made of different materials.

6. The coil component of claim 1, wherein the external electrode includes:
- a seed layer disposed on the one of the end surfaces of the body, and extending onto another surface of the body connected to the one of the end surfaces to cover a portion of the external insulating layer; and
- a plated layer disposed on the seed layer.

7. The coil component of claim 1, wherein the external insulating layer extends onto portions of the end surfaces.

8. The coil component of claim 1, wherein the external insulating layer is a plated layer including the magnetic ceramic.

9. The coil component of claim 1, wherein the external insulating layer penetrates in the body.

10. The coil component of claim 1, wherein the external insulating layer is disposed directly on the body to contact the insulating resin.

11. A coil component, comprising:
- a body including a magnetic metal material and an insulating resin;
- an insulating substrate embedded in the body;
- a coil portion disposed on at least one surface of the insulating substrate, and having a coil pattern and a lead-out pattern extending from the coil pattern to one of end surfaces of the body opposing each other;
- an external insulating layer exposing the lead-out pattern while surrounding the body and covering an end of the insulating substrate on the one of the end surfaces, and only including a magnetic ceramic; and
- an external electrode disposed on the body, and connected to the lead-out pattern,
- the magnetic metal material includes an Fe-based alloy, and
- a portion of the external insulating layer is disposed between the external electrode and the Fe-based alloy.

12. The coil component of claim 11, wherein the magnetic ceramic includes an iron (Fe) component.

13. The coil component of claim 11, wherein the external insulating layer is disposed directly on the body to contact the insulating resin.

* * * * *